United States Patent [19]
Kanapa

[11] Patent Number: 4,820,165
[45] Date of Patent: Apr. 11, 1989

[54] METHOD AND KIT FOR LEARNING SCIENCE AS A LANGUAGE

[75] Inventor: Dorothy J. Kanapa, Kensington, Md.

[73] Assignee: Zero Information Based/Science Productivity Systems, Inc., Kensington, Md.

[21] Appl. No.: 209,334

[22] Filed: Jun. 20, 1988

Related U.S. Application Data

[63] Continuation-in-part of Ser. No. 60,475, Jun. 11, 1987.

[51] Int. Cl.⁴ .................. G09B 23/00; G09B 50/60
[52] U.S. Cl. .................. 434/276; 434/156; 434/308; 434/319
[58] Field of Search ............. 434/276, 319, 156, 308

[56] References Cited

U.S. PATENT DOCUMENTS

| | | | |
|---|---|---|---|
| 3,174,232 | 3/1965 | Beawais | 434/276 |
| 4,189,852 | 2/1980 | Chatlien | 434/319 X |
| 4,270,284 | 6/1981 | Skellings | 434/156 |
| 4,354,841 | 10/1982 | Meeder | 434/319 X |
| 4,445,869 | 5/1984 | Wasserman | 434/156 |

FOREIGN PATENT DOCUMENTS 2475771 8/1981 France .................. 434/156

*Primary Examiner*—Larry Jones
*Attorney, Agent, or Firm*—Mishrilal J. Jain; Holman & Stern

[57] ABSTRACT

The present invention relates to a new programming and feedback system for learning science as a language. The zero information based system and kit of the present invention allow verbalization of science subjects in a substantially less period of time than possible by conventional techniques.

3 Claims, 8 Drawing Sheets

ZIB™ TEACHING APPROACH

Pictures... Computers
Sculptures
Holograms...

ASSESSMENT OF WRITTEN ACUMEN TESTING OVER TIME OF ZIB GROUP (■) VS. STANDARD LECTURE GROUP (□). DATA REPRESENTS MEANS AND STANDARD ERRORS OF 15 SEPARATE DETERMINATIONS FOR EACH GROUP; RESULTS EXPRESSED AS PERCENT COMPARED TO BASELINE DETERMINATIONS.

ASSESSMENT OF VERBAL PROFICIENCY TESTING OVER TIME OF ZIB GROUP (■) VS. THE STANDARD LECTURE GROUP (□). DATA REPRESENTS MEANS AND STANDARD ERRORS OF 14 SEPARATE DETERMINATIONS FOR EACH GROUP; RESULTS EXPRESSED AS PERCENT COMPARED TO BASELINE DETERMINATIONS.

METHOD AND KIT FOR LEARNING SCIENCE AS A LANGUAGE

This is a continuation-in-part of the application Ser. No. 07/060,475 filed June 11, 1987.

BACKGROUND OF THE INVENTION

1. Technical Field

The present invention is related generally to the field of devices and systems for learning or teaching primary languages. More particularly, the present invention is related to a unique programming and feedback system for learning and verbalizing science as a primary language.

2. State of the Art

The presently known methods of teaching science generally include classroom lectures and the like. All such traditional or conventional methods require at least about seven years of intense studying to be reasonably proficient in understanding the subject matter and even more time to be able to verbalize the language related to the science concepts. Clearly, a more efficient and time-saving system would be most desirable.

It is noted that methods of teaching secondary language such as Berlitz, ALM, Armed Forces and the like are known but none of these methods is directed toward teaching a primary language and certainly not teaching science as a primary language.

SUMMARY OF THE INVENTION

It is, therefore, an object of the present invention to provide a science skills programming and feedback system for learning or teaching physical sciences as a language to a person prepared to learn such language, without requiring said person to have prior knowledge of the physical science, in a time period substantially less than that needed for conventional methods or devices.

Other objects and advantages of the present invention will become evident from the following detailed description of the invention.

BRIEF DESCRIPTION OF THE DRAWINGS

These and other objects, features and many of the attendant advantages of the invention will be better understood upon a reading of the following detailed description when considered in connection with the accompanying drawings wherein.

DETAILED DESCRIPTION OF THE INVENTION

Figure 1:
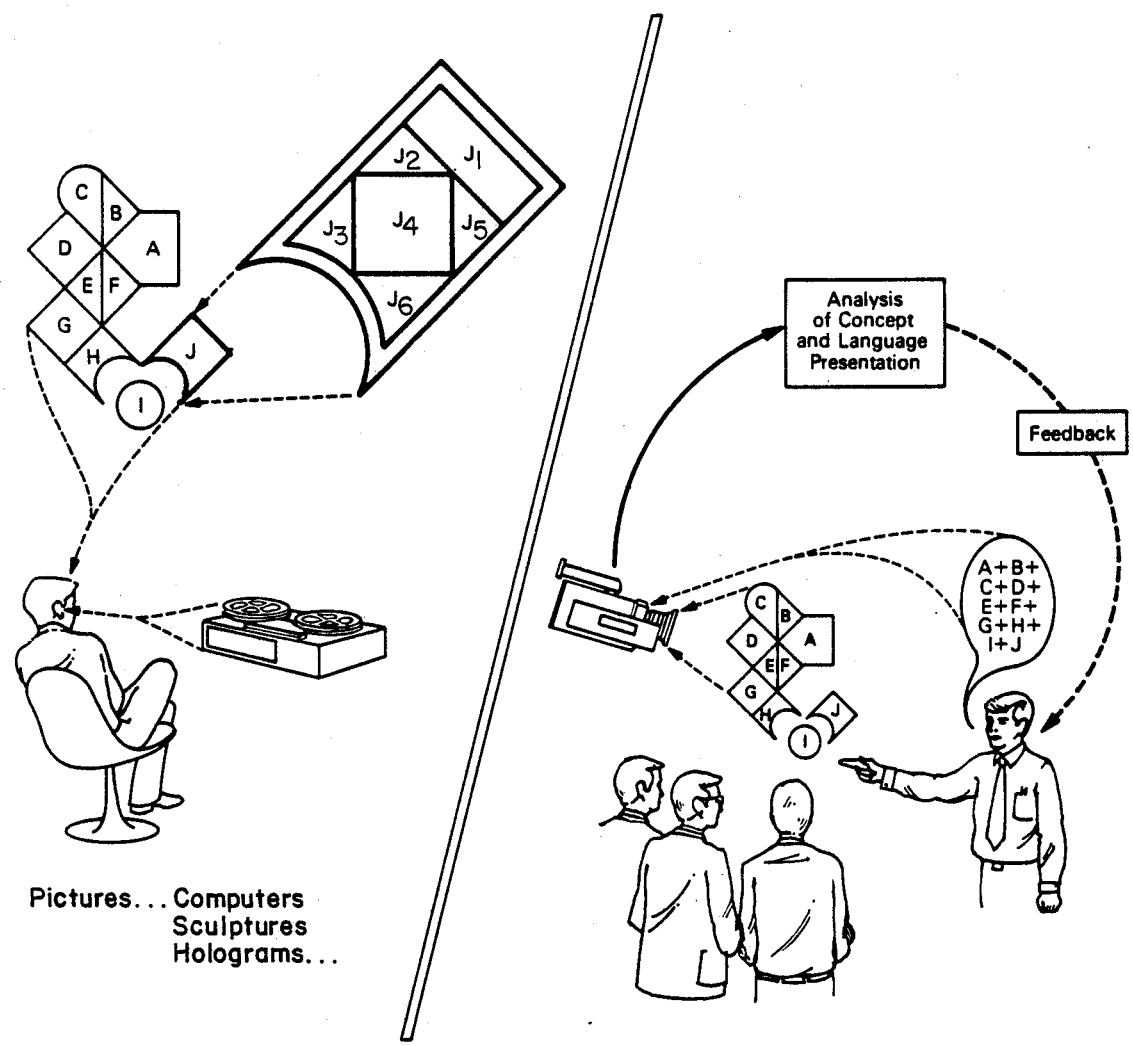
FIG. 1 is a schematic representation of the ZIB science concept and language teaching system including the telescoping and feedback components.

The above and various other objects and advantages of the present invention are achieved by a method of teaching physical science as a primary language, comprising the steps of:

(a) having a person motivated and prepared to learn physical science, without requiring said person to have more than high school reading skill and prior knowledge of said science, completely study a pictorially illustrated science concept and language telescoping zero information based material; then (b) requiring the person in step (a) to completely follow instructions contained, at least partly, in audio means specifically prepared for zero information based teaching; then (c) requiring said person to verbally present the material studied in steps (a) and (b) alone and then in a group of persons treated similar to steps (a) and (b). videotaping means being provided as an analytical tool for performance evaluation, reinforcement and feedback as needed; and (d) repeating step (c) a plurality of times the same day so that the person in step (a) acquires knowledge and verbalization of the material in step (a), without classroom lecture or without presentation of any new information other than that previously presented in the studied audio/visual material by a teacher, in an amount at least equal to or more than and in a time period substantially less than that of conventional method.

The system of the present invention can be better visualized as a type of bio-feedback system that allows the user (regardless of prior science background) to "reprogram" the mental skills allowing for fluency in a very short period of time in the language(s) of high technology science.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference.

The term "physical science" as used herein means such natural sciences as physics, chemistry, biology, medicine and the like and excludes such disciplines as philosophy, theology, music and the like.

The term "primary language" as used herein means a language learned without prior knowledge of a similar culturally-shared language. Examples of such primary languages are young children learning their "native language," such as French in France, English in England, and the like. In order to be able to verbalize a primary language, one must concurrently learn the concepts of the culture that the language reflects. The ability to verbalize effectively in one's primary language requires many years of study, generally about eight years. Learning a "secondary language" is substantially easier since the person has already mastered the concepts, can already verbalize the concepts in one language and simply needs to learn the translation regulations for expressing those concepts n a new language. Nevertheless, learning a secondary language still can be difficult, requiring 1 to 4 years of intense study. Mathematics and the Physical Science are separate cultures unto themselves, with a separate set of non intuitive concepts and an exclusionary language surrounding each of them. Each sub-set of science disciplines centers around a separate body of knowledge and a separate language to communicate the ideas of the discipline. For this reason, the acquisition of language skills in the science follows a primary language learning curve. Usually about seven years of study are required to verbalize science subset languages proficiently by the conventional methods. (Examples: immunology, genetics, engineering, oncology, anesthesiology, ophthalmology, and the like).

A secondary language on the other hand refers to teaching the translation rules for verbalizing a set of previously understood concepts in one language, (i.e., the primary language) into a second language – the secondary language. For most foreign languages (secondary languages) this process taken about 1 to 4 years.

The term "zero information based" means no prior conceptual science information or knowledge whatsoever of the subject is assumed or required.

The term "substantially" less or more, as used herein, means at least two times less or more, preferably four times less or more, respectively, relative to a comparable method or device or a combination thereof.

The term "conventional" or "traditional" as used herein means those known methods or devices and the like which are commonly and ordinarily used and are routinely in vogue.

Preferred materials and methods of the present invention which is designated ZIB (zero information based) are now described.

MATERIALS AND METHODS

Participants

The students who participated in the study included 32 randomly selected employees of a major bioscience research and health care delivery organization in the United States. Participants were recruited for the study through a written announcement of a free course for those who wished to further their bioscience skills in human immunology and those who did not have prior science background were preferred. The 32 participants were randomized to 2 classes in human immunology. Both groups were made up of approximately 30% technicians, 30% nurses, 28% administrative support personnel and 12% administrators. Fifty percent of each class was male, 50% female. The mean age of one class was 31 and the mean age of the second class was 34. Ninety-five percent of both classes had completed undergraduate college education.

Study Design—Verbal and Written Science Acumen Testing

Participants were informed that they would be randomized to receive 1 of 2 methods of instruction. One was utilizing a premiere standard immunology text—*Immunology*, by Hood et al, Second Edition, California: Benjamin/Cummings, 1984, and a standard lecture class format. The second group received zero information-based (ZIB) instruction kits and the interactive practice system (vide infra). Both groups were assigned equal amounts of outside study; class time was equal for both groups (3 hours a day for 3 days).

In order to assess verbal and written immunology skills, written and verbal immunology examinations were prepared by an independent team of immunologists and were administered to both groups. Testing of both groups occurred over 3 time periods: (a) 3 weeks before the class and before students received their study materials (T1); (b) after students completed their home study (T2); and (c) after the classes were over (T3). The examinations focused on basic terms and concepts of human immunology which were covered in both class materials and emphasized in both classes. The written test was prepared in multiple-choice format with a score of 1 point given for each correct answer checked. Anonymity was guaranteed as each student signed their test with a self-assigned code and the completed tests were mailed to the data analysis center. For verbal assessment, the students of both classes were asked to explain specific immunology terms and concepts; a score of 1 point was given for each term and concept correctly answered. Immunology tests were scored by an independent immunologist.

Materials and Methods

Three weeks before the ZIB "final check-out" (vide infra) class was given, the students of the ZIB instruction system each received a ZIB immunology kit comprising a ZIB immunology pictorially illustrated class material, a series of cassette tapes, and a set of instructions. The zero information based material: *Introduction to Human Immunology* was specially prepared and made available in convenient study format including individual art work and, if desired, as a computer disc. It is self-teaching, highly pictorial, and easy-to-understand, assuming that the student has no more than high school level of reading skill and no background whatsoever in the particular science subject being taught. The ZIB material defines all terms as they are presented, from basic science to the most sophisticated current terminology used in the particular science in a manner to rapidly impart the language of the science subject under study and its basic concepts so as to be conceived and learnt by the student. A question and answer section is also included.

The ZIB class students also received a series of specially developed science language tapes which complement the pictorially illustrated teaching material. They are designed to reinforce and help the student hear the terms and concepts already learnt and visualized from the ZIB map teaching system as exemplified in FIG. 1 This allows the student to begin verbalizing the language and basic concepts by answering a series of questions directed specifically to the concepts and terms presented during the learning of the ZIB material: audio correct answers are provided after the student responds, allowing for maximal feedback and "re-programming" of the students' science verbalization skills.

ZIB class students also received a set of pre-class instructions for mastering the telescoping ZIB map program including listening to the tapes in order to be prepared to present the concepts to a class of students undergoing the identical science language skills programming treatment.

For the parallel control study, three weeks before the standard lecture class in immunology was taught, each student of the standard lecture class received the new edition of a modern classic text, such as *Immunology* by Hood, supra. which is widely used in immunology classes. This text presented the material in an understandable pictorial format also with a set of problems and answers at the end of each chapter. The students were directed to read only the specific chapters of immunology that correlated with the information found in the ZIB material. Every effort was made to equalize the overall study time required for the ZIB students and the traditionally taught students. Students were also encouraged to participate in the class.

The ZIB Class — "Final Check-Out"

The testing workshop described herein was sponsored by physicians/teachers and each class was of about 9-hour duration. Only those students who had completed the pre-class instructions attended the workshop.

The ZIB class utilized only the science concept and language telescoping ZIB map materials. After the class coordinator made a brief introduction, students were divided into teams of 2 with each team responsible for teaching a selected immunology concept to the rest of the class. Audio reinforcement of the language of was then retaught by various other student/teachers to the rest immunology was facilitated through repetition as the same concept of the class. Open discussion and questions were restricted to the material contained in the ZIB audio/visual teaching materials. After each round of team teaching (presentation) was completed, the teams were reassigned different concepts from the already studied audio/visual ZIB material for presentation. Fifteen minute breaks were scheduled for team preparation and presentation before each round began. No new information or language not previously presented in the previously studied audio/visual material could be introduced in the class. The ZIB class simply serves as a "final check-out" opportunity for the student to master the concepts and language presented in the ZIB telescoping map teaching device.

Preferred Embodiment of the ZIB Technique

FIG. 1 shows that the ZIB process is minimally a two-step science teaching method: The left-hand side of the FIG. 1 illustrates a Science Concept and Language Telescoping ZIB Map Teaching Device. This highly pictorial teaching device provides an important framework for the conceptualization of the difficult science concepts being taught (such as immunology, genetic engineering, oncogenes, retroviruses, etc.) which are essential nonintuitive concepts and without correlates in real life experiences to provide insights into these concepts. These scientific concepts are not testable by the average layman short of studying for a graduate degree program.

The present invention for the first time provides a "CRASH PROGRAM" for verbalizing and learning basic concepts of specialized physical science in a minimal period of time (about 2 weeks). Furthermore, the Zero Information Based Science Concept and Language Telescoping Map System Device of the present invention assumes no background whatsoever in the science subject area being taught. Only high school reading skills and a motivation to learn are assumed.

The Zero Information Based Science Concept and Language Telescoping Map System Device functions as follows. A graphic representation ("map") of a complicated yet interrelated series of science concepts is presented to the students at least two weeks before the ZIB workshop begins (shown in FIG. 1 as science concepts A through J). The representation can be made on paper or any other suitable material, in association with any printed material, or alternatively can be presented to the student via video display system with the use of computer disks. The subcomponents of concept A through J are then intensely and vigorously defined. In addition, the mechanisms whereby each subcomponent interrelates with the other subcomponent to produce the overall function of concepts A through J is clearly set forth.

The pictorial element of the ZIB Map Teaching Device for Science Concepts and Language has been designated as "telescoping" because the teaching approach telescopes up—adds on detail—and telescopes down—all the way down to a zero information base (molecules and atoms).

Figure 2:
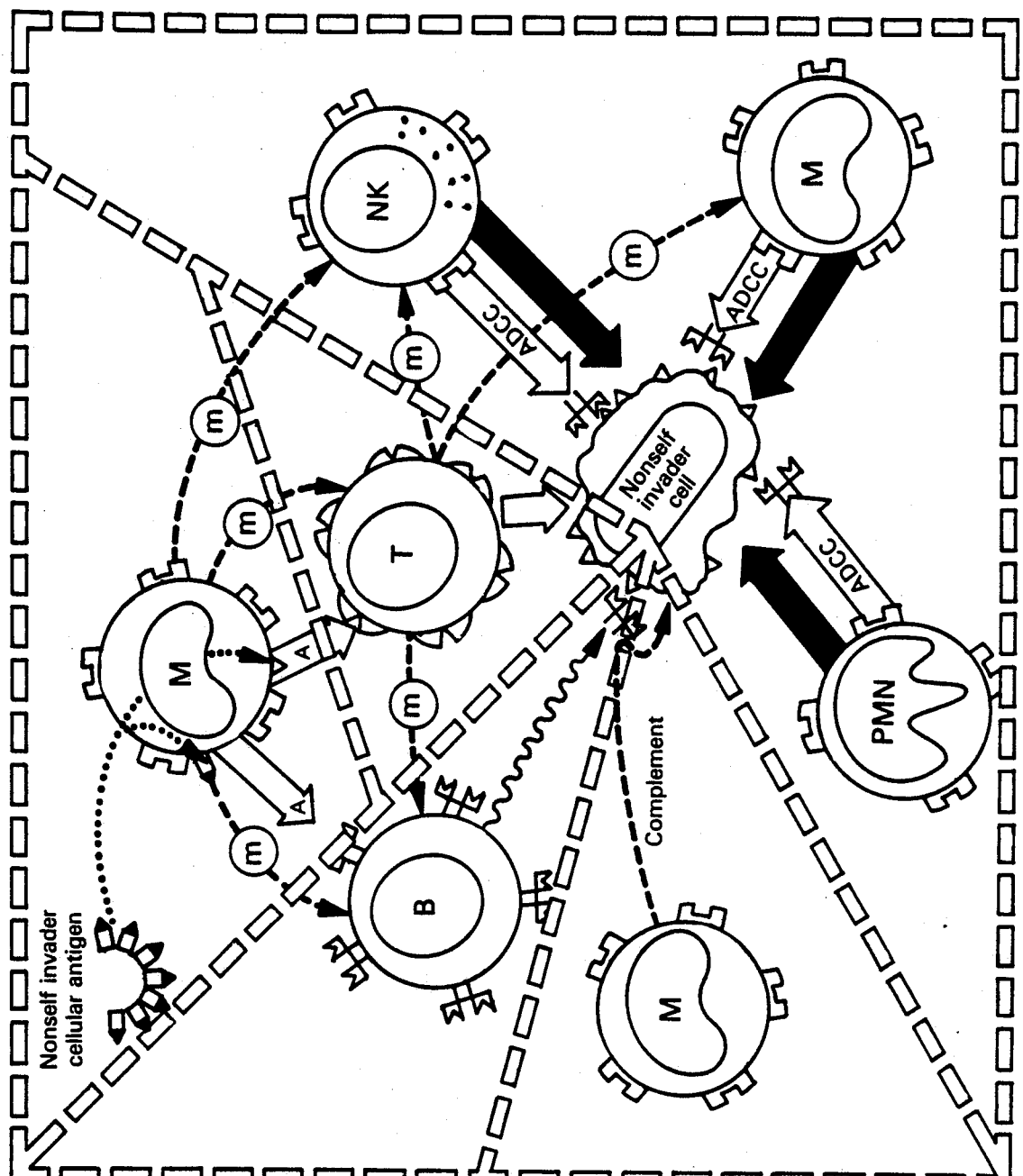
FIGS. 2-6 are illustrative examples of the ZIB methodology.
Figure 3:
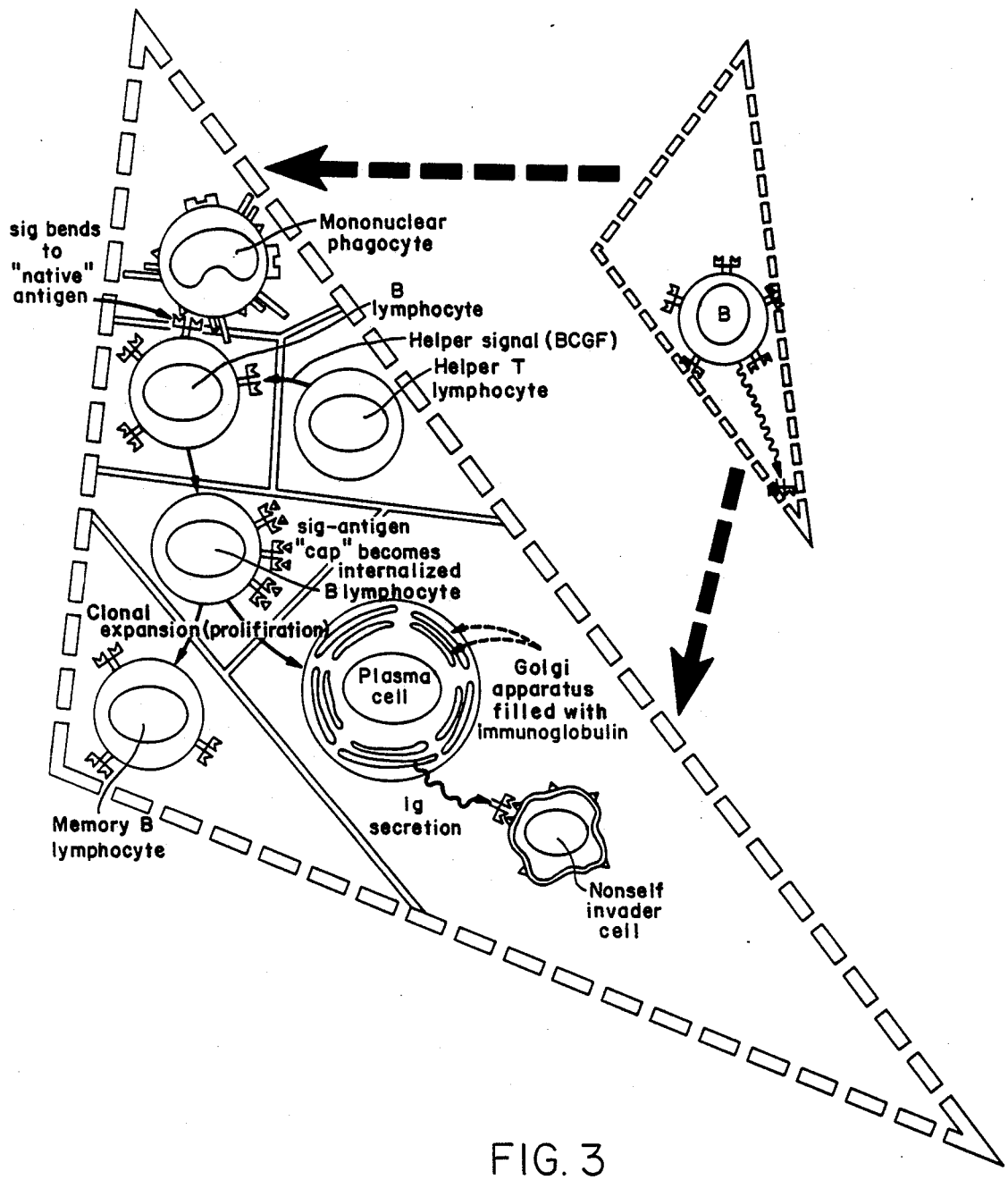

Specific examples of the Telescoping Map System are shown in FIGS. 2–6. FIG. 2 shows a pictorial map of the immune system. After the map has been introduced to the student, it is broken down into its various subcomponents. One by one each subcomponent is reviewed and "telescoped up"—levels of detail are added. FIG. 3, for example, shows the B lymphocyte activation segment of the immune system map and how it telescopes up by adding detailed layers of what B lymphocyte activation is composed. Once all the subcomponents of the immune system may have been identified, detailed and interrelated, the map is then reassembled for review.

Figure 4:
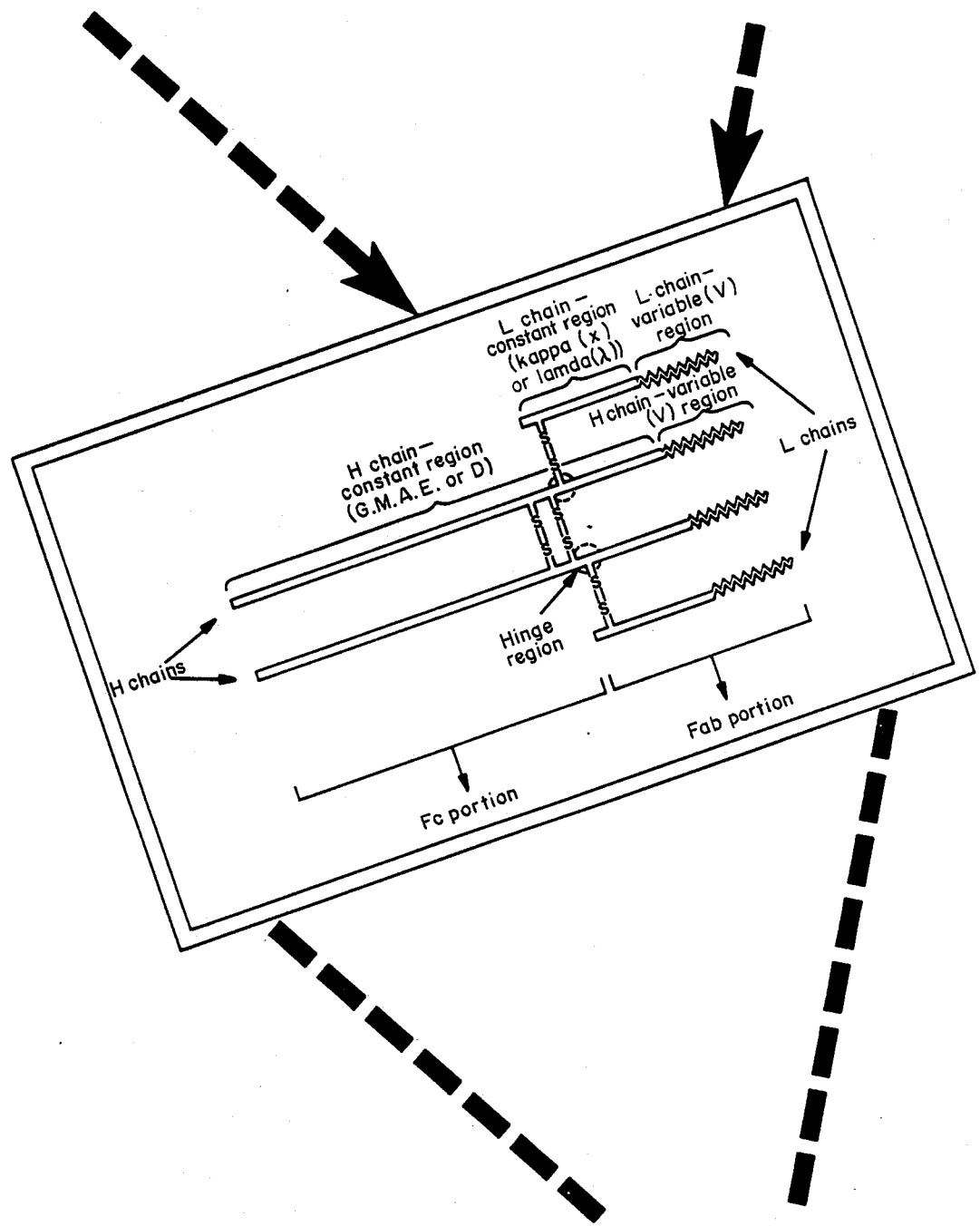
Figure 5:
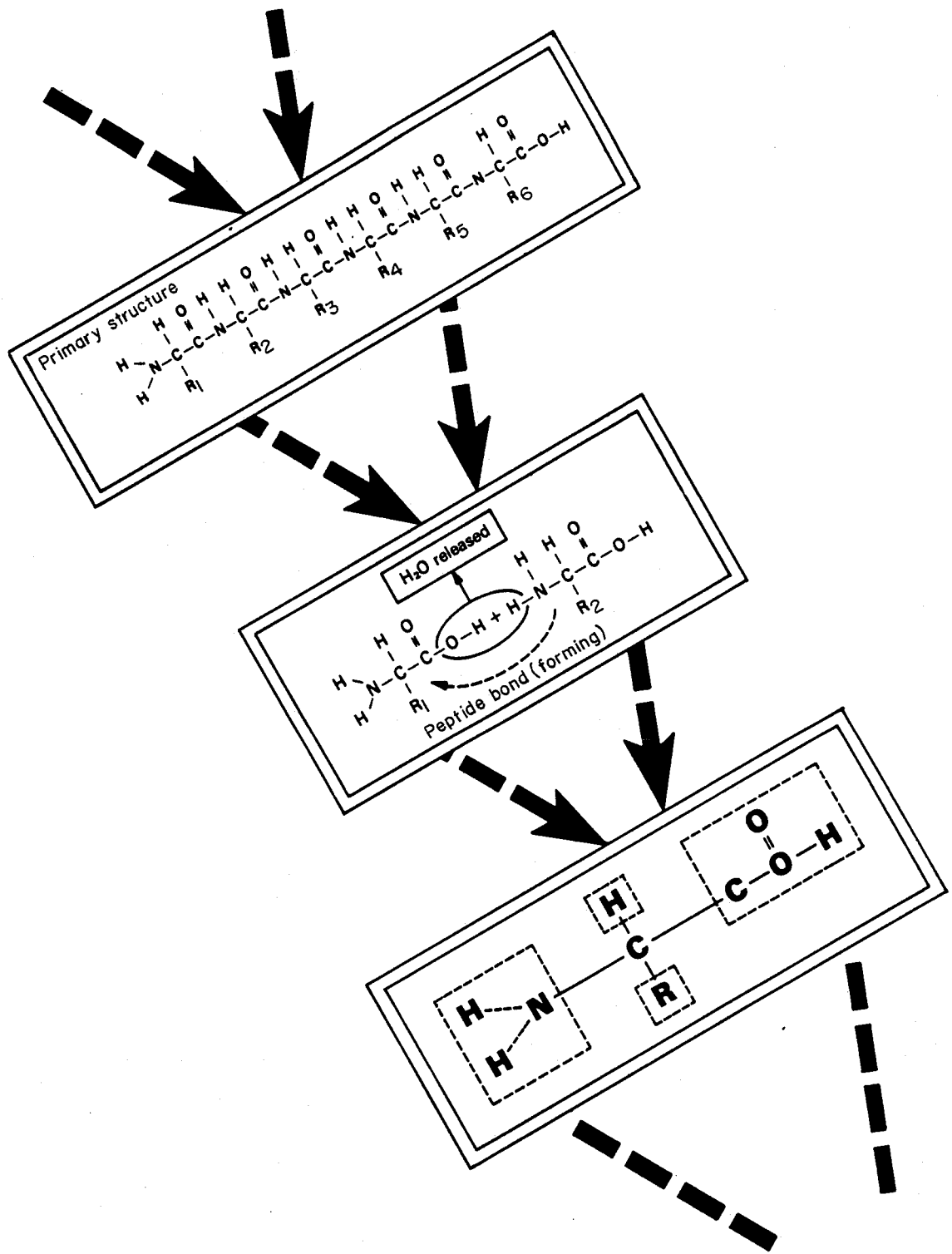
Figure 6:
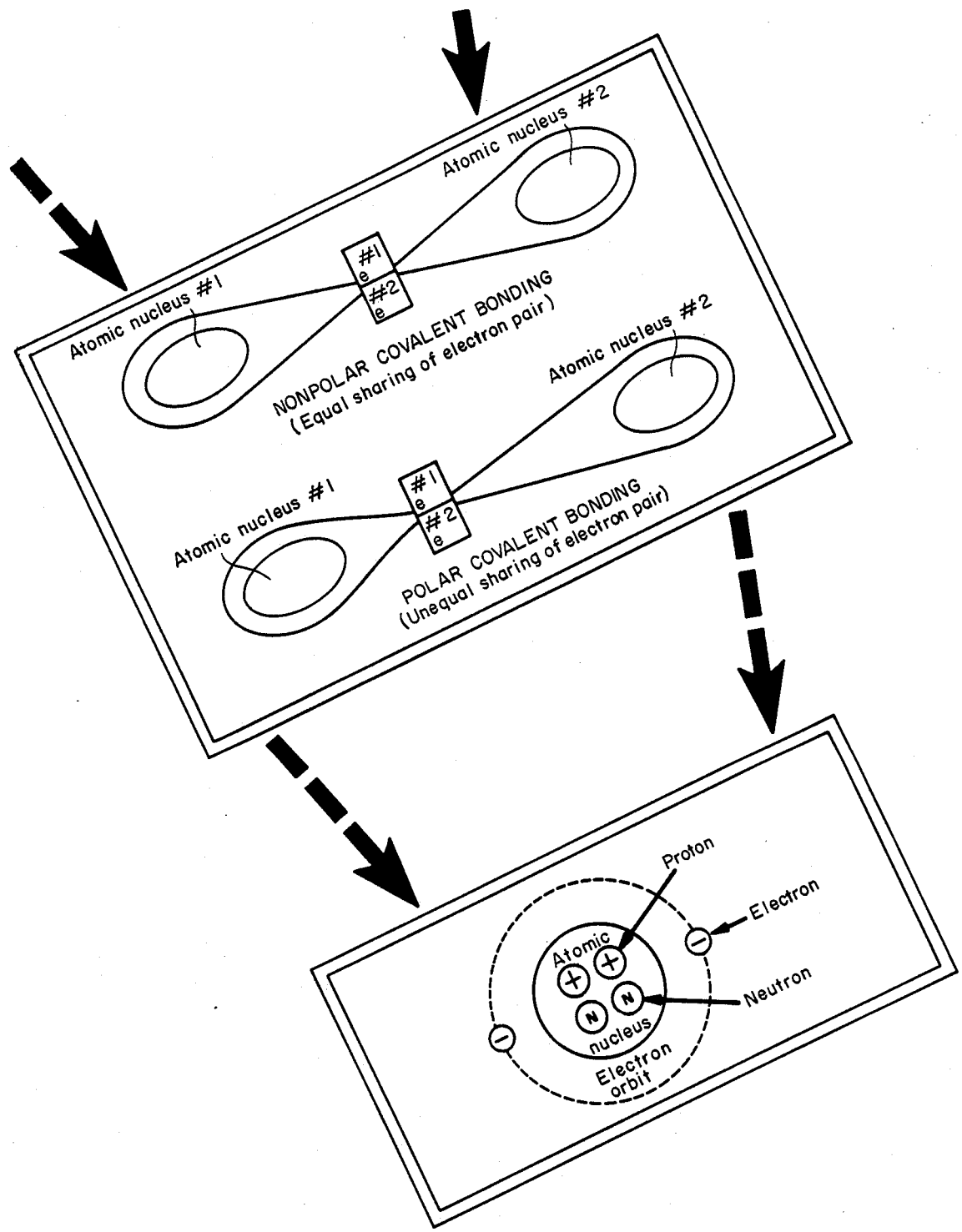

Each subcomponent element of the map is also "telescoped down," all the way to zero. FIG. 4, for example, shows how an immunoglobulin, one of the subcomponents of the B lymphocyte activation segment of the immune system, is telescoped down through several levels of detail (FIGS. 5–6) to ground zero—the atom. Each element of the immune system may be thus telescoped down to its most basic components.

As shown in FIG. 1, audio reinforcement is provided to the student by the use of an audio cassette tape or by a computer-driven digitized laser disk. The information contained in the audio reinforcement provides a verbal presentation of each pictorial concept (A through J as shown in FIG. 1) followed by a series of questions and answers directed to the student in order for the student to begin practicing the verbalization of those concepts. The telescoping technique, together with the audio and written reinforcement, continues until the student has mastered the material and is ready to enter Phase II of the ZIB approach—the ZIB workshop.

The second component part of the ZIB approach is represented by Part II of FIG. 1 (right side of the figure)—Science Concept and Language Telescoping ZIB Map Testing and Feedback Device. So far, the student was provided a two-week period of time to review the Science Concept and Language Telescoping ZIB Map Teaching Device materials as described above. Then the student is instructed that he or she will be teaching a group of his or her peer the science concepts to be mastered, in the ZIB workshop (total time of the ZIB workshop being approximately 18 hours). All students are paired in teams of two with each team responsible for teaching the rest of the class a specified concept. Usually a short period of time to rehearse presentations with peers is provided (approximately 10 to 15 minutes). Then each student is required as a part of the team to function as an accomplished teacher and present the material to his or her peers in a "real life" situation. The student (now teacher) is required to instruct the other students on the nature of the concepts (A for example in FIG. 1), the reason for the graphic representation of each subcomponent and how each subcomponent part interacts with the other subcomponents. This "real life" teaching of difficult science concepts by one non-scientist to other non-scientists is recorded on video camera device with audio recording capabilities. The video and audio images are then analyzed to determine the accuracy and clarity of the student's presentation. Both the clarity of presentation of concepts and the appropriateness of the language employed are analyzed. This analysis can be performed by experts that supervise the utilization of the teaching device; however, an automated computer-driven voice analyzer attached to a microprocessor and memory unit can also provide a similar objective ranking of students' performance. The students' performance with regard to clearly presenting each concept is numerically ranked. In addition, a numerical ranking for the students' successfully utilizing the language is also provided. This objective feedback is then provided to the student to allow the student to better identify his or her strengths and weaknesses with regard to master of the material presented in the "Science Concept and Language Telescoping ZIB Map Teaching Device".

The Standard Lecture Class

The ZIB system is then compared with the standard or conventional teaching methodology. In the standard immunology class, the same teacher presented the identical information covered in the ZIB class, but in a standard lecture format. The blackboard was used as necessary to help students visualize concepts. Class participation was encouraged resulting in questions and open discussion.

Statistical Methods

All scoring of written and verbal acumen tests was performed by an independent immunologist. Mean baseline group scores on verbal and written testing were assigned a value of 100% and changes in this value were monitored throughout the study; standard errors for each group's test scores were determined. The ZIB and standard lecture class groups were compared in their verbal and written proficiency by the paired Student t test.

Results

Figure 7:
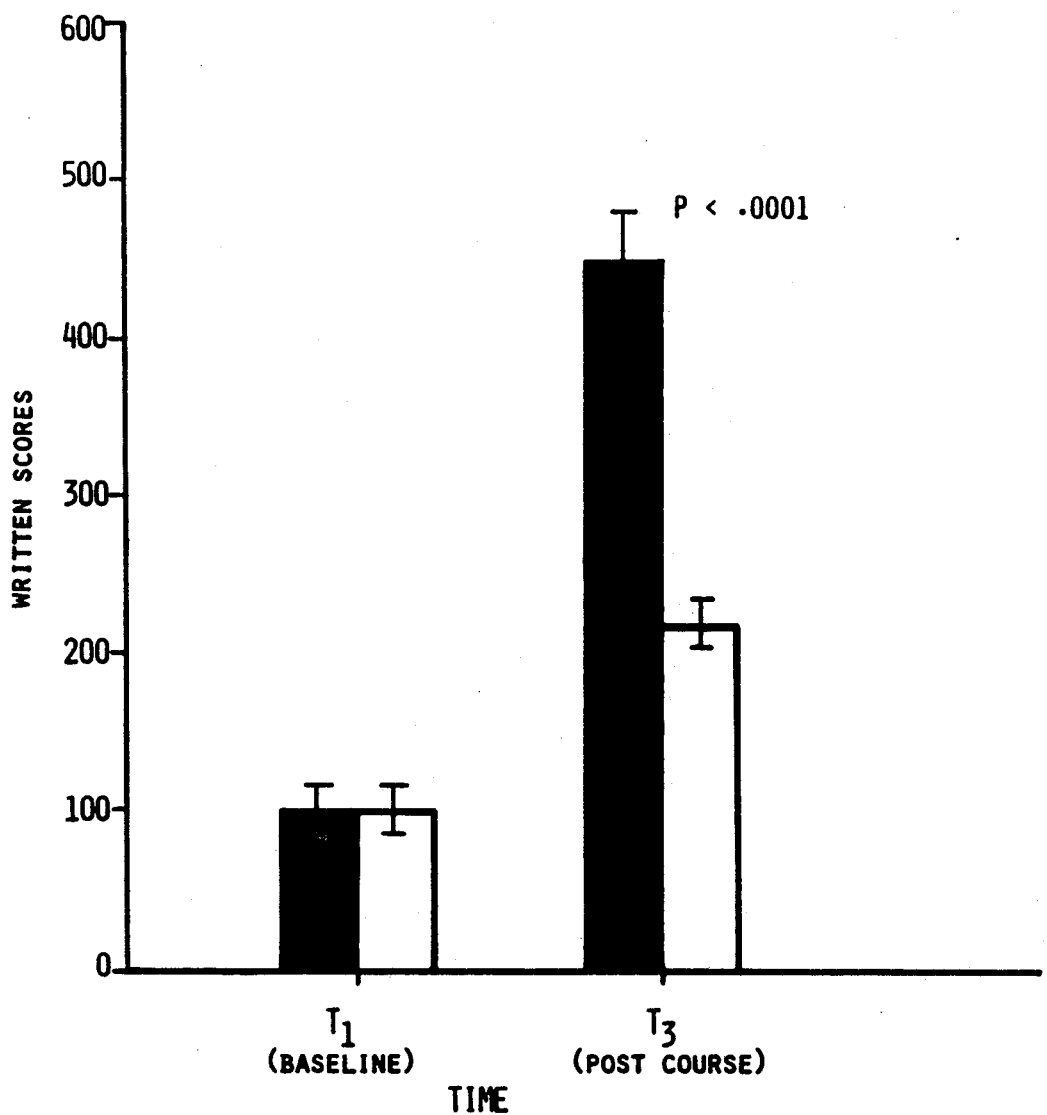
FIG. 7 shows the results of assessment of written acumen testing over time of the ZIB ( ) versus the standard lecture group (■). Data represent means and standard errors of 15 separate determinations for each group and the results expressed as percent compared to baseline determinations.

Preliminary testing of the students' written verbal acumen was undertaken and the mean baseline scores of the ZIB group and the standard lecture group were assigned a value of 100%. In assessing written proficiency (FIG. 7), it was found that the ZIB group quadrupled their written immunology acumen at T3 (post course) over their baseline value at T1 (3 weeks before the class and before the students received their class materials) ($p<0.001$) while the standard lecture group doubled their acumen over the same period of time ($p-0.0001$). Although both groups improved their written immunology acumen, it was found that the ZIB group had doubled their written proficiency at T3 in comparison to the standard lecture group ($p<0.0001$).

Figure 8:
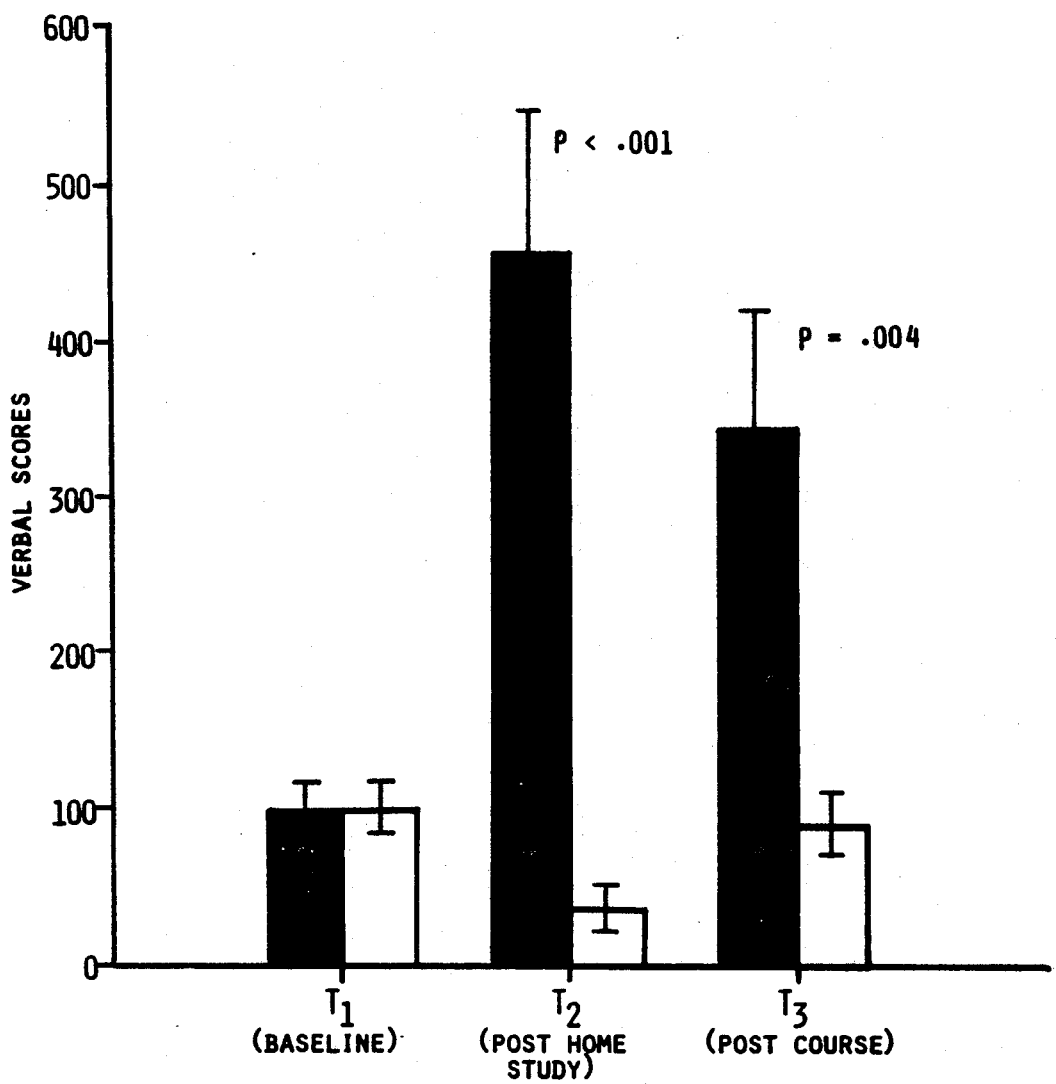
FIG. 8 shows the results of assessment of verbal proficiency testing over time of the ZIB ( ) versus the standard lecture group (■). Data represent means and standard errors of 14 separate determinations for each group and the results expressed as percent compared to baseline determinations.

Results of the verbal acumen testing over time between the two groups were found to be significantly different (FIG. 8). In assessing verbal acumen it was found that the ZIB group quadrupled their verbal proficiency at T2 (post-home study) over their baseline values at T1 (p 0.001) while the standard lecture group failed to improve. The ZIB group had more than quadrupled their proficiency at T2 when compared to the standard lecture group ($p<0.001$). Results of the verbal acumen testing at T3 (post course) indicated that the ZIB students maintained a significantly high level of verbal proficiency and had more than tripled their verbal acumen in comparison to the standard lecture group scores ($p=0.004$).

It is clear from the above that the zero information-based (ZIB) system is an efficient and time-saving method for teaching the basic concepts and languages of science and is superior to the conventional teaching approach in accomplishing this goal.

It is realized, of course, that the acquisition of verbal science skills is a complex process, one that is not well met through the standard science education format. For example, although in the standard lecture workshop the students improved their second written immunology test, they nevertheless failed to improve their ability to verbalize the basic language and concepts of immunology in comparison to the students who participated in the ZIB training. In contrast, the ZIB class which received the zero information-based visual and audio reinforcement and class interaction, surpassed the standard lecture class on both verbal tests, and maintained a high level of verbal proficiency when compared to the students of the standard lecture class.

Of course, for gaining proficiency in speaking the language and basic concepts of a high-technology science (such as human immunology as exemplified herein) novice students, regardless of their background in that subject area, need to go through a multistep learning process. First, students need to clearly visualize the basic concepts which are central to that science language. Secondly, students need to listen and hear the basic words of that science discipline at their own pace. Then, through the "final check-out" phase the students need to practice verbalizing their newly-acquired science language skills with each other through playing the role model of an actual teacher in a small group setting of about 10-20 students. This unique combination of the telescoping science concept and language learning approach and feedback system provide for the first time a rapid and successful tool for gaining proficient communicational skills in an area of sophisticated science which was not heretofore possible. The utility of quickly acquiring such verbalizing skills in the modern, high-tech, science oriented society cannot be overemphasized. The ZIB system allows novice students to rapidly program their own science language skills in a self-pacing, cost effective and time efficient manner. By responding to the "feedback-prompting" provided by this instructional system, the student rapidly becomes programmed to acquire the required science concepts and science language verbalizing skills.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for teaching physical science as a primary language comprising the steps of:
   (a) having a person motivated and prepared to learn physical science, without requiring said person to have more than high school reading skill and prior knowledge of said science, completely study pictorially illustrated science concept and language telescoping zero information based material; then
   (b) requiring the person in step (a) to completely follow instructions contained, at least partly, in audio means specifically prepared for zero information based teaching; then (c) requiring said person to verbally present the material studied in steps (a) and (b) in a group of persons treated similar to steps (a) and (b), videotaping means being provided as an analytical tool for performance evaluation, reinforcement or feedback as needed; and (d) repeating step (c) a plurality of times the same day so that the person in step (a) acquires knowledge and verbalization of the material in step (a), without class room lecture by a teacher, in an amount at least equal to or more than and in a time period substantially less than that of conventional method.

2. A kit for zero information based learning of physical science as a primary language, comprising a specific, zero-information-based (ZIB) telescoping material on a science subject desired to be learnt; means for audio programming and feedback reinforcing of specific contents of said material; and instructions for ZIB learning.

3. The kit of claim 2 wherein said ZIB material is selected from the group consisting of telescoping pictorially illustrated material. audio/visual cassette, computer program and combination thereof.

* * * * *